United States Patent
Faccio et al.

(10) Patent No.: US 7,292,752 B2
(45) Date of Patent: Nov. 6, 2007

(54) TUNEABLE GRATING ASSISTED DIRECTIONAL OPTICAL COUPLER

(75) Inventors: Daniele Franco Angelo Faccio, Como (IT); Giacomo Maria Gorni, Milan (IT)

(73) Assignee: Pirelli & C. S.p.A., Milan (IT)

( * ) Notice: Subject to any disclaimer, the term of this patent is extended or adjusted under 35 U.S.C. 154(b) by 0 days.

(21) Appl. No.: 10/578,252

(22) PCT Filed: Nov. 5, 2003

(86) PCT No.: PCT/EP03/12328

§ 371 (c)(1),
(2), (4) Date: May 4, 2006

(87) PCT Pub. No.: WO2005/050306

PCT Pub. Date: Jun. 2, 2005

(65) Prior Publication Data

US 2007/0058900 A1    Mar. 15, 2007

(51) Int. Cl.
G02B 6/24    (2006.01)
G02B 6/36    (2006.01)

(52) U.S. Cl. ............................. 385/37; 385/50; 385/30; 385/131

(58) Field of Classification Search .................. 385/10, 385/14, 15, 24, 27, 28, 30, 37, 50, 127–132
See application file for complete search history.

(56) References Cited

U.S. PATENT DOCUMENTS 4,737,007 A    4/1988    Alferness et al.
6,097,865 A    8/2000    Alferness et al.
6,724,968 B2 *    4/2004    Lackritz et al. ............. 385/131
2003/0133490 A1    7/2003    Grote et al.
2003/0138209 A1 *    7/2003    Chan ........................... 385/37

FOREIGN PATENT DOCUMENTS

EP    0 778 479    6/1997

(Continued)

OTHER PUBLICATIONS

Bjorklund et al., "Prospects for Electro-Optic Polymer Devices", Lasers and Electro-Optics Society Annual Meeting, IEEE, pp. 466-467, (1993).

(Continued)

Primary Examiner—Hemang Sanghavi
(74) Attorney, Agent, or Firm—Finnegan, Henderson, Farabow, Garrett & Dunner, L.L.P.

(57) ABSTRACT

A tuneable grating assisted directional optical coupler to couple a transmission signal has a first waveguide including a first core and a first cladding, the first waveguide having a first effective refractive index. The coupler also has a second waveguide including a second core and a second cladding, the second waveguide having a second effective refractive index different from the first effective index and being in substantially close proximity to the first waveguide in a predetermined region to provide coupling therebetween. A periodic perturbation is positioned in the coupling region to cause the coupling to be wavelength selective for one given wavelength function of the first and/or the second effective refractive index. Additionally, the second cladding of the second waveguide has a tuneable material and the first cladding of the first waveguide has a non-tuneable material.

21 Claims, 12 Drawing Sheets

FOREIGN PATENT DOCUMENTS

EP   1 018 665   7/2000
JP   63-174002   7/1988

OTHER PUBLICATIONS

Eldada et al., "Thermooptic Planar Polymer Bragg Grating OADM'S With Broad Tuning Range", IEEE Photonics Technology Letters, vol. 11, No. 4, p. 448-450, (1999).

Horita et al., "Polarisation Insensitive and Tuneable Optical Add and Drop Multiplexer Utising Vertically Stacked Buried Semiconductor Waveguides", Electronics Letters, vol. 35, No. 20, pp. 1733-1734, (1999).

Bosc et al., "Hybrid Silica-Polymer Structure for Integrated Optical Waveguides With New Potentialities", Materials Science and Engineering, vol. B57, pp. 155-160, (1999).

* cited by examiner

TUNEABLE GRATING ASSISTED DIRECTIONAL OPTICAL COUPLER

CROSS REFERENCE TO RELATED APPLICATION

This application is a national phase application based on PCT/EP2003/012328, filed Nov. 5, 2003, the content of which is incorporated herein by reference.

TECHNICAL FIELD

The invention relates to a tuneable grating assisted directional optical coupler, which couples a predetermined wavelength among the channels of an input signal between two waveguides using a grating provided in the coupling region thereof. More particularly the coupler of the present invention is wavelength tuneable, i.e. the predetermined wavelength can be changed from one targeted wavelength to another.

TECHNOLOGICAL BACKGROUND

Optical devices for optical channel filtering, such as wavelength add/drop filters, bandpass filters, directional couplers, etc, are important elements of optical telecommunication systems.

In Wavelength Division Multiplexing (WDM), a plurality of N mutually independent optical signals are transmitted along a line. Each of these independent signals has a respective transmission wavelengths $\lambda_1, \lambda_2 \ldots, \lambda_N$, which are different from each other and each of which defines a transmission "channel". All these wavelengths, which have a spacing between them, should be included in a useful amplification bandwidth of optical amplifiers used in the line.

However, for such signal to be useful, it must be possible to wavelength selectively drop the optical signal coming in through an optical fiber (or through another optical conduit) to a fiber/conduit conveying to the respective user/destination and to wavelength selectively add signals to the fiber. Therefore, efficient adding and dropping of channels, without modifying the other optical channels, is even more crucial in DWDM (Dense Wavelength Division Multiplexing) where a very high number of channels at slightly different wavelengths is transmitted in a single fiber simultaneously.

For this purpose, it is desirable to realize filters which may add or drop one or more signals in a certain bandwidth. An example of such a filter is disclosed in U.S. Pat. No. 4,737,007 to Alferness. In this patent a narrow-band, wavelength selective optical coupler is described, which includes two optical fibers, each comprising a core region and a cladding region, and a Bragg diffraction grating formed in the coupling region of the two fibers.

In the following, only couplers including a grating, which is a periodic structure formed by spatially varying refractive index distribution throughout a defined volume or the boundary of a guiding region, are considered.

In particular, considering two waveguides 1 and 2 having effective refractive indices $n_1$ and $n_2$, respectively, being in close proximity to each other so as to form a directional coupler, and a periodic perturbation (grating) inserted in the coupling region such that its wave-vector obeys to one of the following relationships $$|K_+| = \frac{2\pi}{\Lambda_+} = \beta_1 + \beta_2 = \frac{2\pi}{\lambda_0}(n_1 + n_2) \quad (I)$$

$$|K_-| = \frac{2\pi}{\Lambda_-} = \beta_1 - \beta_2 = \frac{2\pi}{\lambda_0}(n_1 - n_2) \quad (II)$$

where $\Lambda$ is the grating periodicity, $\beta_1$ and $\beta_2$ are the propagation constant in waveguides 1 and 2 at $\lambda_0$, there is coupling between the two waveguides only at the specific wavelength $\lambda_0$ named above. If Eq. (I) is satisfied, then the wavelength $\lambda_0$ is coupled in the backward direction from one waveguide to the other and the directional coupler is said to be a contra-directional coupler, whereas if Eq. (II) is satisfied, the wavelength $\lambda_0$ is coupled in the forward direction and the coupler is said to be a co-directional coupler.

From the above equations (I) and (II), it is clear that, given a transmission signal including a plurality of channels having different wavelengths $(\lambda_1, \ldots, \lambda_n)$ propagating in the first waveguide, the filtered wavelength to the second waveguide is $$\lambda_0 = \Lambda(n_1 \pm n_2). \quad (III)$$

A particularly desirable additional characteristic of optical couplers is wavelength tunability, so that the dropped wavelength may be changed, in order to increase the flexibility of networks. The goal of a tuneable coupler is therefore to select one channel (or several channels) in a given incoming input optical signal and transmitting all other channels through the filter, said channel being changeable.

Several different tuneable optical filters have been developed. A proposed solution has been to realize the core region of one of the two waveguides in a tuneable material, i.e. a material whose refractive index may be changed, therefore changing $n_1$ or $n_2$. This implies, a change in the filtered wavelength $\lambda_0$ (see eq. (III)).

Silica on its own may be thermo-optically tuned. However its thermo-optic coefficient dn/dT is of the order of $10^{-5}/°$ C. and a change of temperature of $100°$ C. will typically shift the filter wavelength by less than 1 nm. This may restrict the applications where the desirable tuning range is of several nm.

In "*Thermooptic Planar Polymer Bragg Grating OADM's with Broad Tuning range*", published in IEEE Photonics Technology Letters, vol. 11 (1999), p. 448, a tuneable add/drop multiplexer having a grating printed in a single-mode polymeric waveguide with a thin-film heater is described. Thermal tuning can be achieved by a large thermo-optic coefficient dn/dT of $-3 \cdot 10^{-4}/°$ C.

Applicants have noticed that employment of polymeric materials with high dn/dT in the waveguide core region makes polymer stability a crucial issue and may affect long-term reliability of the coupler. Furthermore, for an OADM (Optical Add/Drop Multiplexer) consisting of a waveguide and two optical circulators, the high cost of the circulators makes the device too expensive.

In "*Polarisation insensitive and tuneable optical add and drop multiplexer utising vertically stacked buried semiconductor waveguides*", published in Electronics Letters vol. 35, No. 20, p. 1733-1734, a tuneable, vertical and contra-directional coupler filter, in which specially designed buried semiconductor waveguides are used, is disclosed. In particular, the two waveguides are made of InGaAsP, are buried in a InP cladding and a grating is formed between the waveguides in the filter region. The tunability is achieved by changing the temperature.

Applicants have noted that, in order to obtain a tuning of several nm, for example of 10-11 nm, the temperature of III-V semiconductors such as InGaAsP should be varied of at least 500° C., which implies a huge thermal variation of the overall device, which can be detrimental for the device performances. They have further observed that fabrication technology based on III-V semiconductors is rather complex and expensive.

In "*Hybrid silica-polymer structure for integrated optical waveguides with new potentialities*", published in Material Science and Engineering vol. B57, p. 155-160, a coupler comprising two coplanar waveguides having silica cores and a polymer cladding is described. More specifically, the directional coupler of this paper comprises two ridge cores made of silica which are covered by the same polymer cladding. A Bragg grating is UV-induced in both waveguides in the central part of each sample. The negative thermal optical coefficient for the polymer refractive index enables the authors to auto-stabilise the Bragg grating in temperature.

Applicants have noted that in the described coupler a variation in temperature induces the same variation of effective refractive index in the two waveguides with the aim of stabilizing the coupled wavelength and to render it independent of the temperature. This device would be unsuitable for making a tuneable directional coupler.

U.S. Pat. No. 6,097,865 to Alferness et al. discloses a wavelength filter having a low index waveguide, a high index waveguide, having substantially different geometries which results in substantially different effective indices, and a grating for coupling therebetween. Both waveguides are made of InGaAsP. In this patent, the so obtained high effective index differential $\Delta n = n_2 - n_1$ of the filter waveguides is desired in order to achieve a high bandwidth and reduce cross-talk.

SUMMARY OF THE INVENTION

The present invention relates to a grating assisted directional optical coupler, in particular to a tuneable asynchronous coupler, i.e. a directional coupler such that the two waveguides have different effective refractive indices so that no coupling normally occurs between them. Each of the waveguides comprises a core and a cladding. The directional coupler comprises a coupling region, where the two waveguide cores are in close proximity to each other so that coupling is made possible, and two input/output regions where the two waveguide cores are separated by a distance that is large enough to avoid coupling between the two waveguides. The optical signal enters or exits to or from the input/output regions. Preferably, the two waveguide cores are placed in two different vertically stacked horizontal planes, i.e., the cores are vertically stacked and separated by a vertical distance d. In this case, the horizontal distance between the two waveguide cores in the input/output regions decreases in the coupling region to a value small enough to allow coupling. A periodic perturbation, preferably a Bragg grating, is placed in the coupling region and it is designed to induce either a co-directional or a contra-directional coupling between the two waveguides.

Applicants have found that the directional coupler should comprise a tuneable material layer placed on one of the two waveguide cores.

From eq. (I) and (II) it is clear that a variation in the coupled wavelength is given by $$\Delta\lambda_0 = \Lambda(\Delta n_1 \pm \Delta n_2) \quad (IV)$$

where $\Delta n_1$ and $\Delta n_2$ are the variations of the effective indices of the first and the second waveguide, respectively.

Applicants have understood from eq. (IV) and from the known relationship $$\Lambda \propto \frac{1}{n_{tot}},$$

where $n_{tot}$ is the algebraic sum of the effective indices of the two waveguides, that, in order to obtain a high tunability, i.e. a $\Delta\lambda_0$ of the order of several nm for a reasonable variation of the external parameter (T or E), the value of $$\frac{\Delta n}{n}$$

of the tuneable material, where $\Delta n$ is the variation of the refractive index n for said variation of the external parameter, should be considered. In case of temperature as external parameter, for a temperature variation, $\Delta T$, not larger than 200° C., $$\frac{\Delta n}{n}$$

should be not smaller than $2 \times 10^{-2}$, for $\Delta T \leq 100°$ C., $$\frac{\Delta n}{n}$$

should be not smaller than $1 \times 10^{-2}$.

Temperature variations not larger than 100° C. are preferred to improve the stability of the employed polymers. More generally, temperature variations not larger than 100° C. are preferred because functioning of the optical device, i.e., the coupler, can be attained with relatively low power consumption.

Applicants have observed that, in order to obtain an highly tuneable coupler, i.e. whose tunability is of the order of several nm for a reasonable variation of temperature, materials having a thermo-optic coefficient $$\left|\frac{dn}{dT}\right| \geq 10^{-4} / °C.,$$

where n is their refractive index and T the temperature, in particular polymers, can be employed.

However the invention is not limited to thermo-optic materials, but it also covers materials having electro-optical properties as long as their refractive index can be varied in a relatively wide range, as liquid crystals, for a reasonable variation of the applied electric field. In this case the parameter of interest is the electro-optic coefficient r of the material; r is correlated to the refractive index variation dn through the following relationship:

$$\frac{dn}{dE} = \frac{2}{n^3}r$$

where E is the applied electric field. Materials of interest are those having an electro-optic coefficient $|r| \geq 2.5$ nm/V, so that a variation of several nm is obtained for a reasonable variation of the electric field, i.e. not larger than 2 V/μm, more preferably not larger than 1 V/μm. The value of $$\frac{\Delta n}{n}$$

should be not smaller than $2 \times 10^{-2}$ for an electric field not larger than 2 V/μm and not smaller than $1 \times 10^{-2}$ for an electric field not larger than 1 V/μm. A class of materials that may have these properties is that comprising liquid crystal materials.

Although electro-optic materials are possible tuneable materials according to the invention, in particular in a technology based on silicon-compounds materials, employment of polymers is preferred to that of liquid crystals because in the latter case technology can be more complex as confinement materials are necessary to confine the liquid crystal. Furthermore, the employment of electro-optic materials generally requires two electrodes for the tuning of the electric field of the tuneable material. This may increase complexity of the tuneable device when compared to the employment of thermo-optic materials.

Both these conditions on the thermo-optic or electro-optic coefficient lead to an overall index variation $\Delta n$ of the material $\geq 10^{-2}$, more preferably $\Delta n = 0.02$-$0.03$, for a reasonable variation of the external parameter in issue.

In order to solve the problems of the cited prior art and to obtain a reliable highly tuneable coupler, applicants have developed a tuneable coupler which is based on a realisation of a waveguide and a core using standard techniques and standard materials, on which the tuneable cladding is deposited.

As a preferred embodiment, a first silicon compounds-based waveguide comprising a first core and a first cladding is realised on a substrate and on top of the first silica-based waveguide a second silica-based core is fabricated. A tuneable polymer cladding is then deposited onto the second core. This allows to avoid any rather complex polymer etching or troubles of connections between polymer and silica. This embodiment of the invention allows therefore to combine the good thermo-optical properties of polymers and the quality of the silicon-compounds based waveguides without giving rise to complex fabrication steps.

With silicon compounds, we refer to materials comprising substantially silica glass, i.e., $SiO_2$, ternary compounds such as $SiO_xN_y$ or $Si_3N_4$ and its non-stochiometric compounds. Dopants, such as Ge, B, P or Al, can be intended to be comprised in the matrix of silicon compounds, for instance in order to modify the refractive index of the material.

It is known that in contra-directional couplers (for which eq. (I) applies), a problem of cross-talk between channels may arise. Indeed in these couplers, the grating couples the desired channel from one waveguide to the other (as expected) and also an undesired channel back into the input waveguide. If the wavelength of this reflected back channel is in the operating range of interest (i.e, in the bandwidth of the input signal), the input channels are modified. This is particularly detrimental when the coupler is used in a relatively large wavelength range, e.g., the C-band. Applicants have found that the effective indices of the two waveguide should be preferably different enough so that the coupler filters only one channel without affecting any other channels within a specific range of wavelengths. Namely, they have found that this effective indices' difference should preferably verify the following equation:

$$n_2 - n_1 > 2n_1 \left( \frac{\lambda_{max}}{\lambda_{min}} - 1 \right), \quad (V)$$

where $\lambda_{max}$ and $\lambda_{min}$ are the largest and the smallest wavelength in the desired range, respectively. If the condition in eq. (V) is met for the effective indices of the two waveguides, then cross-talk between channel will be minimized in the desired range, i.e. it will add/drop a channel only at $\lambda_0$ without affecting any of the other wavelength channels.

These objects and others, which will become clear from the following description, are achieved by the invention with a grating assisted directional optical coupler obtained in accordance with the appended claims.

BRIEF DESCRIPTION OF THE DRAWINGS

Further features and advantages of a tuneable grating assisted directional optical coupler according to the invention will become more clearly apparent from the following detailed description thereof, given with reference to the accompanying drawings, where:

FIG. 4 is a cross sectional view of a second embodiment of the contra-directional grating assisted directional optical coupler of the type shown in FIG. 2a;

PREFERRED EMBODIMENTS OF THE INVENTION

Figure 1:
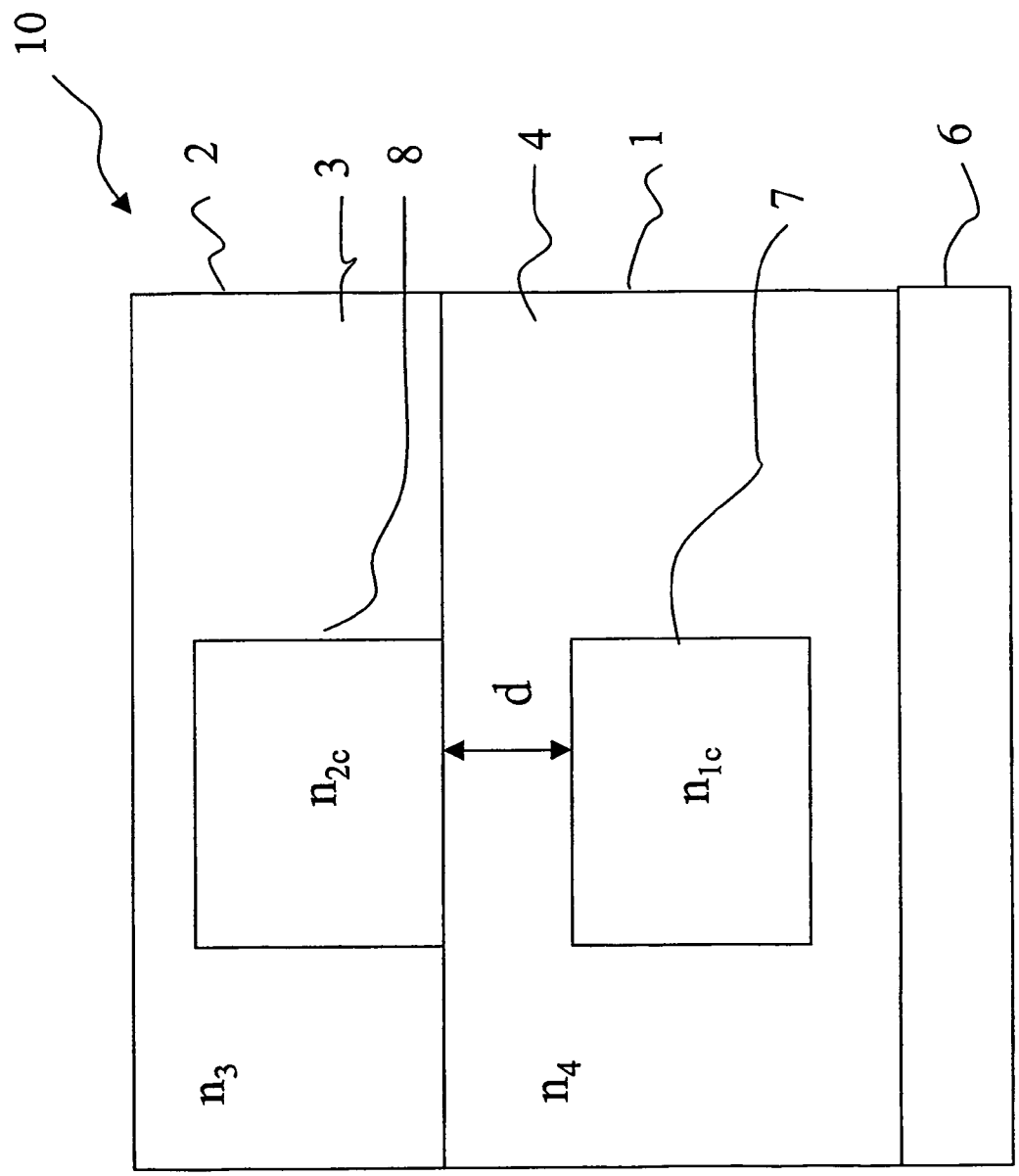
FIG. 1 is a schematic cross-sectional view of a tuneable grating assisted directional optical coupler according to the present invention.

With reference to FIG. 1, 10 indicates a tuneable grating assisted directional optical coupler according to the present invention.

FIG. 1 schematically illustrates a cross-sectional view of a coupler 10 comprising a first 1 and a second waveguide 2, in close proximity with each other so as to define a coupling region of length L (taken along the direction of mode propagation) and form a directional coupler. First waveguide 1 comprises a first core 7 and a first cladding 4 and second waveguide 2 comprises a second core 8 and second cladding 3. In order to have guided modes along the waveguide cores, the refractive index $n_{1c}$ of the first core should be larger than the refractive index $n_4$ of the first cladding and the refractive index $n_{2c}$ of the second core is larger than the refractive index $n_3$ of the second cladding. The waveguides 1,2 are realised on a substrate 6, preferably a silicon wafer, and have effective refractive indices $n_1$ and $n_2$, respectively, different from each other. The coupler 10 is therefore asynchronous and, depending on the difference $n_1-n_2$ and the distance d between the two waveguide cores 7,8, the amount of optical power exchange between the two waveguides may be reduced to very low values (<1%): no coupling occurs between the two waveguides in the absence of a grating. The refractive index difference between the two waveguides 1,2 is achieved using different materials or using substantially different geometries to realize the two waveguides.

Figure 2A:
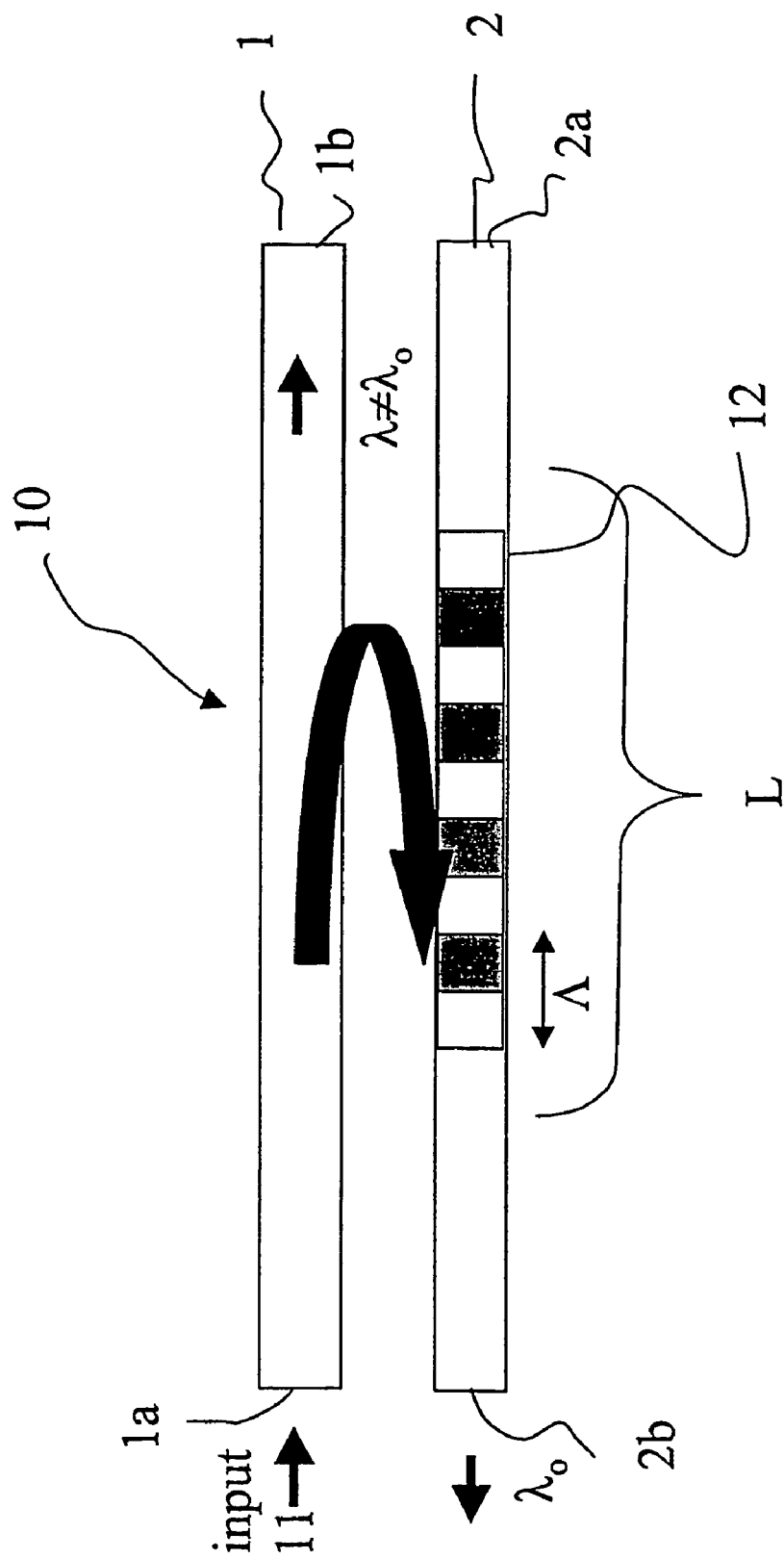
FIG. 2a schematically depicts a lateral cross-sectional-view of a contra-directional grating assisted directional optical coupler of FIG. 1.

Referring to FIG. 2a, the first and second waveguide 1,2 each comprises an input port 1a, 2a and an output port 1b, 2b. The coupler 10 receives at the input port 1a of the first waveguide 1, upstream of the coupling region, an input optical signal 11 which includes at least a signal wavelength $\lambda_0$. Preferably, the optical signal 11 carries a number of optical channels $\lambda_1, \ldots, \lambda_N$, more preferably comprised between about 1530 nm and 1565 nm, which corresponds approximately to the C-band. For example, the input signal 11 can be a DWDM signal with 100 or 50 GHz of channel spacing.

A periodic perturbation 12, preferably a periodic perturbation (having period $\Lambda$) of the refractive index, is induced in the coupling region L of the coupler 10 either of the first waveguide 1 or of the second waveguide 2 by any appropriate technique. In the example shown in FIG. 2a, the periodic perturbation is introduced in the second waveguide 2. The periodic perturbation 12 preferably defines a linear Bragg grating, however it may also be embodied by a non linear perturbation grating as a chirped or apodised grating. Various arrangements for the position of the periodic perturbation 12 are conceivable, with the constraint that the optical fields of the input and the output waveguide 1,2 overlap in at least a portion of the periodic perturbation 12. Gratings can be produced by a variety of techniques such as UV-induced photolithography, etching or electron beam writing, said techniques can be chosen also in dependence of the desired characteristics of the grating.

The wave-vector K of the grating 12 obeys either to eq. (I) or to eq. (II). The K-vector of the grating 12 compensates for the β-mismatch between the two waveguides 1,2 thus restoring synchronism and complete power exchange at $\lambda_0$: this wavelength is coupled from a waveguide to the other. The bandwidth of this process is determined by the strength of the grating and the distance d between the two waveguide cores 7,8 and may be tailored to a specific value by varying these two parameters.

If the period perturbation 12 is so realised that eq. (I) is satisfied, then the coupler 10 is defined as "contra-directional" and the input optical signal 11 launched in the input port 1a passes unaffected through input waveguide 1 except for the channel of wavelength $\lambda_0$ which is coupled in the backward direction from the input waveguide 1 into the output waveguide 2 and is dropped from output port 2b of the output waveguide 2. This embodiment is sketched in FIG. 2a, where the periodic perturbation 12 is realized on the second waveguide 2.

If, on the other hand, eq. (II) is satisfied, then the wavelength $\lambda_0$ is coupled in the forward direction from the input waveguide 1 into the output waveguide 2 and the coupler 10 is called a "co-directional coupler", represented in FIG. 2b, where the periodic perturbation 12 is realized on the second waveguide 2.

Figure 2B:
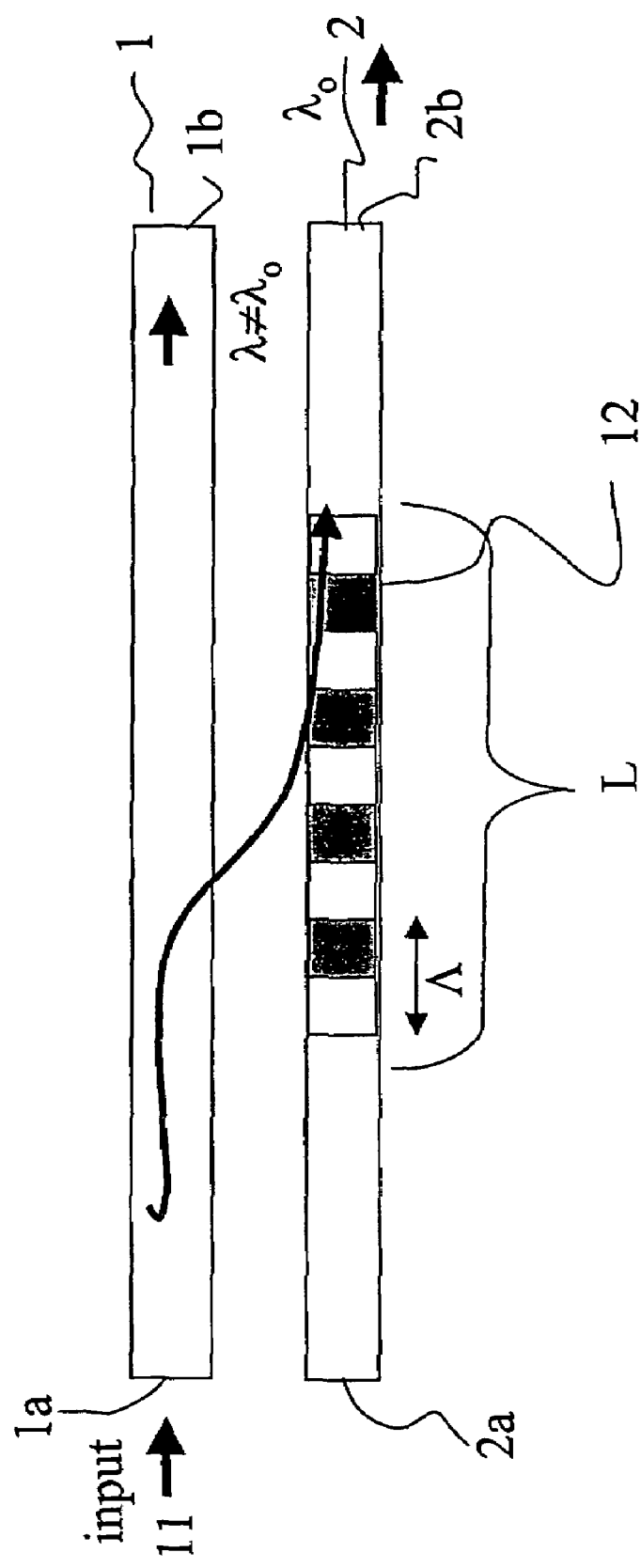
FIG. 2b schematically depicts a co-directional grating assisted directional optical coupler of FIG. 1.

Although the periodic perturbation 12 is preferably placed in the output waveguide 2, as shown in the embodiments of FIGS. 2a and 2b, in order to reduce optical losses of the transmitted signal (at wavelengths different than those coupled back or forward) due to the grating, it is to be understood that a coupler in which the periodic perturbation is introduced in the input waveguide, e.g., waveguide 1, is also conceivable.

Referring back to FIG. 1, at least one of waveguide cores 7, 8 is preferably fabricated from silicon compounds-based material, which may also include dopants such as Ge, B, P, or Al. Preferably the core of the input waveguide is made of silica with the possible addition of one or more dopants. It is understood that other materials may be employed as known by those skilled in the art. Consequently, an exhaustive list of possible materials used to create these components is not offered herein.

The first waveguide 1 comprises a first cladding 4 surrounding the first core 7, said cladding being fabricated preferably from a "non-tuneable" (whose meaning will be explained below) material, even more preferably from a silicon compounds-based material, more preferably from undoped or doped $SiO_2$. The first cladding 4 may completely surround the first core 7, as represented in FIG. 1, or it may be possible, for example, that the first core 7 is in contact with the substrate 6 for a portion of its boundary and for the remaining portion is in contact with the first cladding 4. It is however to be understood that the material surrounding the first core should always have a refractive index which is lower than that of the core to ensure the propagation of guided modes.

According to the present invention, the second waveguide 2 comprises a second cladding 3 which is realized in a tuneable material, surrounding (in one of the possible different ways above described for the first core) the second core 8. With the term "tuneable material", we refer to a material whose refractive index can be varied by changing an external parameter, such as the temperature or the electric field. Preferably, the cladding material of the present invention is taken from the category of materials classified as polymers, which have an index of refraction n that varies with temperature T, $n_3(T)$. In particular their preferred $$\left|\frac{dn}{dT}\right|$$

is not smaller than $1\times10^{-4}/°$ C., which means that their refractive indices can vary significantly in a relatively small temperature range. This corresponds to index variations $\Delta n$, for a ΔT of 100-200° C., not smaller than about 0.01. Preferred polymers are DeSolite™ 3471-1-129 produced by DSM or Sylgard™ 184 produced by Dow Corning. However any transparent polymer satisfying the above written requirements is suitable for the realization of the cladding 3.

It is to be noted that the suitable polymer for the waveguide cladding should be selected so that its refractive index $n_3(T)$ remains smaller than that of the waveguide core in the entire temperature range of interest for the functioning and tunability of the device.

We note that although also silica has a refractive index that varies with temperature, the order of magnitude of its thermo-optic coefficient is sensibly smaller than those of polymers, namely at least a factor of 10, the thermo-optic coefficient of silica being of about $10^{-5}/°$ C. Considering its refractive index of 1.45 (for undoped silica), the value of $$\frac{\Delta n}{n}$$

for a variation of 200° C. is only of the order of $10^{-3}$. Therefore, within this context, silica is considered a "non-tuneable" material. With the term "non-tuneable material", we refer herein to a material in which $$\frac{\Delta n}{n} < 10^{-2}$$

for a reasonable variation of the external parameter. It is to be noted than in this context, non-tuneable materials comprise also materials having relatively high thermo-optic or electro-optic coefficient, but low $$\frac{\Delta n}{n},$$

i.e., lower than $10^{-2}$ for a temperature variation of 100° C. or for an electric field variation of 1 V/μm. An example of non-tuneable material with relatively high thermo-optic coefficient is GaAs, where $dn/dT=2.5\times10^{-4}/°$ C. and $n=3.4$ (at room temperature). A variation in temperature of 100° C. gives a variation in the refractive index Δn of 0.025, but a $$\frac{\Delta n}{n}$$

of about $7\times10^{-3}$.

It is to be understood that also a reversed configuration, in which the input waveguide has a tuneable material cladding and the output waveguide has a non-tuneable cladding is intended to be covered by the present invention.

According to a preferred embodiment of the present invention, the periodic perturbation is realised on the core of the non-tuneable waveguide, in particular in case of a contra-directional coupler. Indeed in these couplers the grating is generally a so-called "strong grating", in which the variation of refraction index along the grating is larger than about $10^{-3}$. In case the grating is made by etching, the depth of the etched areas of the grating should be relatively deep in order to have a strong grating. This can make the realisation of a polymeric cladding over the grating cumbersome, as the polymeric material may not completely fill the deep regions of the grating leaving unfilled portions, in which case the response of the coupler would not be optimal. In case of co-directional couplers, this technological difficulty can be reduced in case of a "weak" grating, in which the refractive index variation is smaller than about $10^{-3}$ (a shallow etching or another non-etching technique can be used for the grating) so that the grating can be alternatively placed either in the tuneable waveguide or in the non-tuneable one.

Preferably, the grating is induced in the core of either of the waveguides. However, configurations comprising a grating in one of the cladding layers can be envisaged.

Additionally, preferably the grating is realised on the output waveguide to minimise losses.

Even if in all the figures referred to in the present description, the coupler of the present invention is always depicted as a "vertical" coupler, i.e. a coupler wherein the waveguides 1,2 are vertically stacked, the teachings of the present invention apply to a coupler having coplanar waveguides as well. Additionally, although the two waveguides 1,2 are shown having a square or rectangular cross-section (both of the cores and claddings), waveguides with a differently shaped cross-section may be used.

EXAMPLE 1

Figure 3:
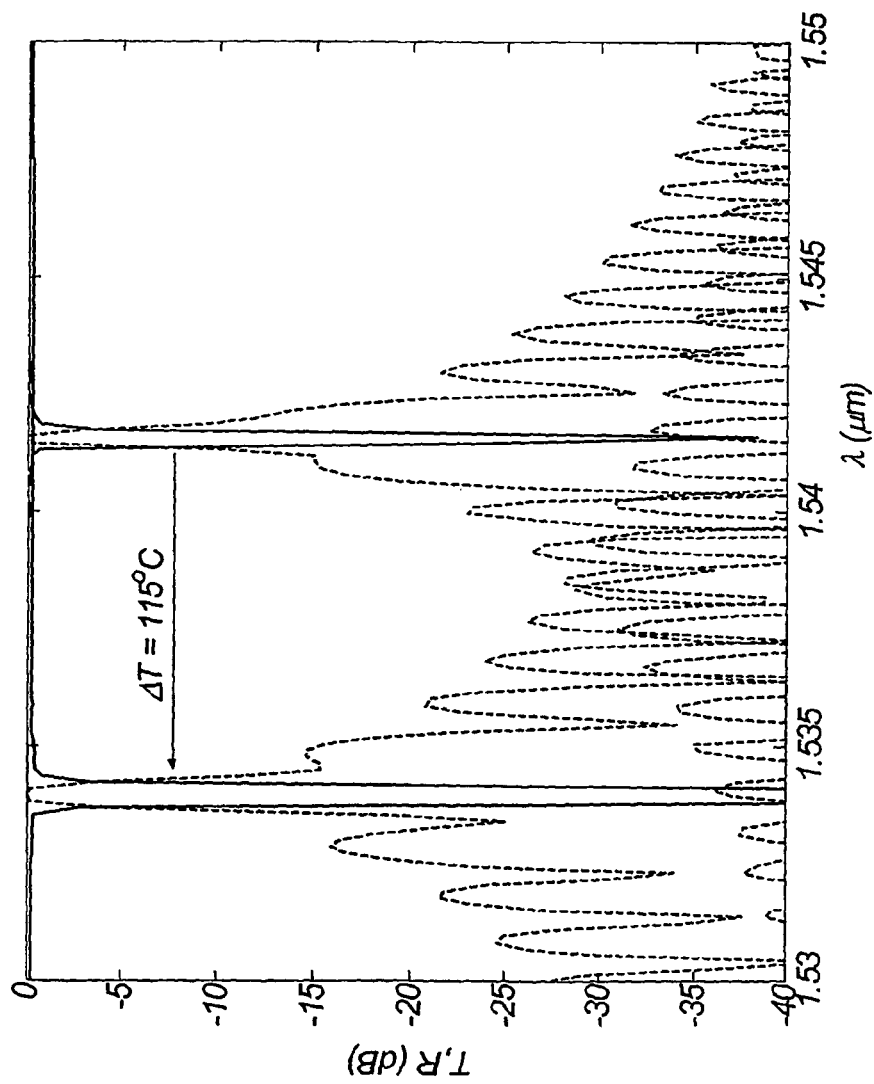
FIG. 3 is a graph showing the spectra response of the contra-directional grating assisted directional optical coupler of the type shown in FIG. 1 for two different temperatures of the upper cladding.

Referring again to FIG. 1, a contra-directional coupler 10 including two vertically stacked waveguides 1,2 on a substrate 6 is shown. The input waveguide in whose core also the grating is formed is the lower waveguide 1. The filtered wavelength is transferred to the upper waveguide 2. The core of the input waveguide 7 is square, its dimensions are $1.1\times1.1$ μm$^2$ and it is realised in $SiO_{x1}N_{y1}$ having a refractive index $n_{1c}$ of 1.7, while the core 8 of the output waveguide 2 is also square ($1.1\times1.1$ μm$^2$ as above) and it is realised in $SiO_{x2}N_{y2}$ having a refractive index $n_{2c}$ of 1.567. The distance d between the two cores is 1.5 μm. The lower cladding material 4 is undoped silica, with a refractive index $n_4$ of 1.446. The lower waveguide 1 and upper core 8 are fabricated following standard techniques. The last fabrication process is a deposition over the upper core 8 of the upper cladding 3, in particular by spin-coating, which is realized in DeSolite™ 3471-1-129 produced by DSM. This polymer has a high thermo-optic coefficient equal to $-2.6\cdot10^{-4}/°$ C. so that a variation In temperature of 115° C. gives a change in the refractive index of 0.03. In particular, at room temperature, the refractive index $n_3$ of the upper cladding 3 is equal to $n_3=1.48$, whilst after said temperature variation, $n_3=1.45$. The grating period Λ is of 262 nm. Using eq. (IV) and by numerical simulations, applicants have found that by changing the temperature of said amount, the effective index of the output waveguide 1 is changed and the dropped wavelength of the coupler is shifted by 7 nm. This shift is visualized in FIG. 3, where the spectra response of the contra directional coupler of FIG. 1 is plotted for two different temperatures of the upper tuneable cladding separated by 115° C. In particular, the solid curves represent the spectra of the transmitted light (input waveguide), while the dotted lines represent the spectra of the reflected light (output waveguide). Employing the same device, a shift of 12 nm for a ΔT=200° C. is expected.

EXAMPLE 2

Figure 4:
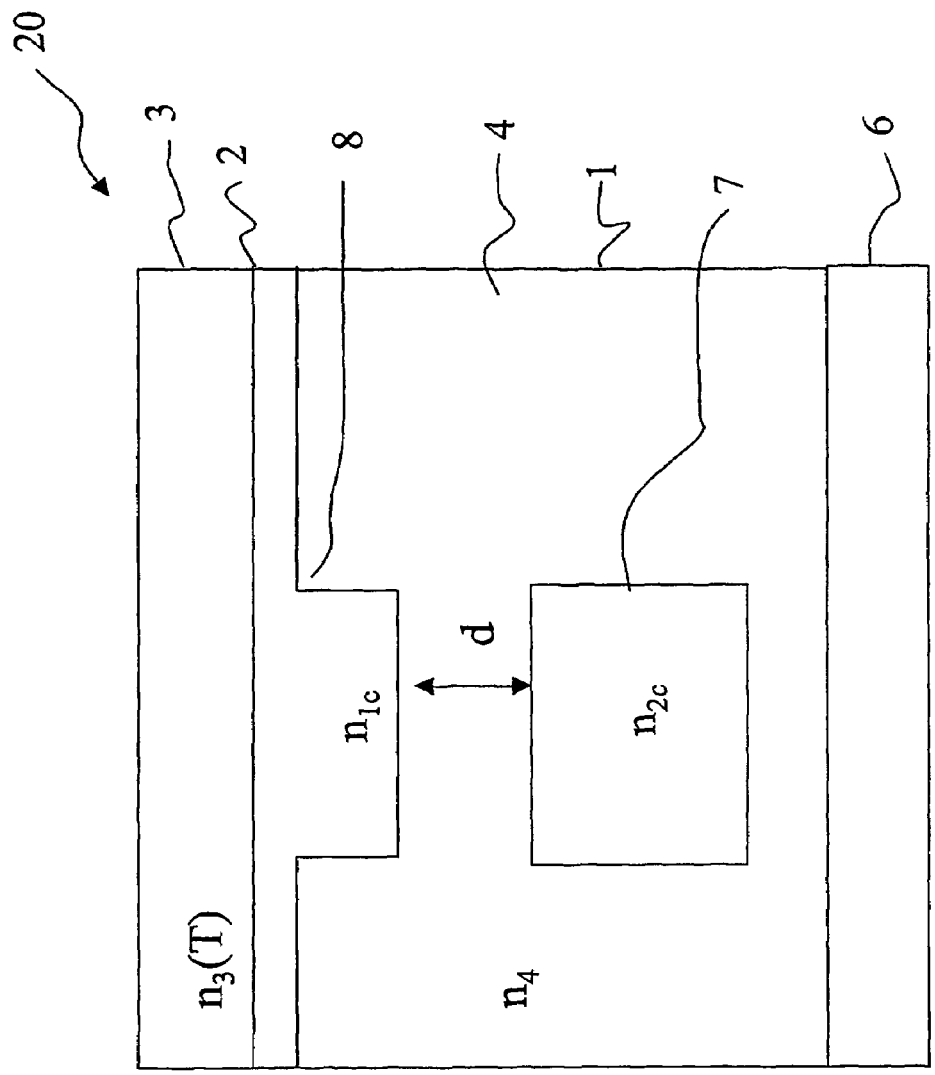

FIG. 4 shows an alternative embodiment of a contra-directional coupler 10. The lower input waveguide 1 is realized as in example 1, while the upper waveguide 2 is an inverse ridge waveguide having the upper cladding 3 in a tuneable material, particularly in made of Sylgard™. In this example, the refractive index $n_3(T)$ of the upper cladding 3 goes from $n_3=1.4$ to $n_3=1.37$ for a temperature variation of 103° C. (the thermo-optic coefficient is equal to $-2.9 \times 10^{-4}/°$ C.). Upper core 8, lower core 7 and lower cladding 4 are made of silicon-compounds materials. This structure may be advantageous because an accurate control of the thickness of the core—and thus of the coupler birefringence—can be achieved. Indeed, to control the coupler birefringence, it is necessary to control, among others, the dimensions of the core. In the coupler of example 1, this can be obtained varying the size of the core, in the specific case the length of the side of its square cross-section, during the etching process. However during etching, an inaccuracy of about 3% in the dimensions is normally expected. On the other hand, controlling the thickness of a film, as in this case, is more accurate and therefore a more accurate control of the birefringence is obtained.

From the above examples and the description, it is clear that the coupler of the present invention has a wide tuning range and at the same time is rather easy and relatively cheap to fabricate: fabrication is carried out using the desired materials optimised for the desired filter properties and the tuneable layer is applied only at the last stage as an upper cladding. In this way, the polymer is integrated with the standard and well tested materials without imposing any limitations in the other fabrication step and having at the same time a large tunability range guaranteed by this polymer cladding.

Examples 1 and 2 are related to a contra-directional coupler, which is an easy device to fabricate and has a reliable response. However, using the teaching of the present invention, also a co-directional coupler can be obtained, which has a wider tunability despite of the more complex construction.

EXAMPLE 3

Figure 5:
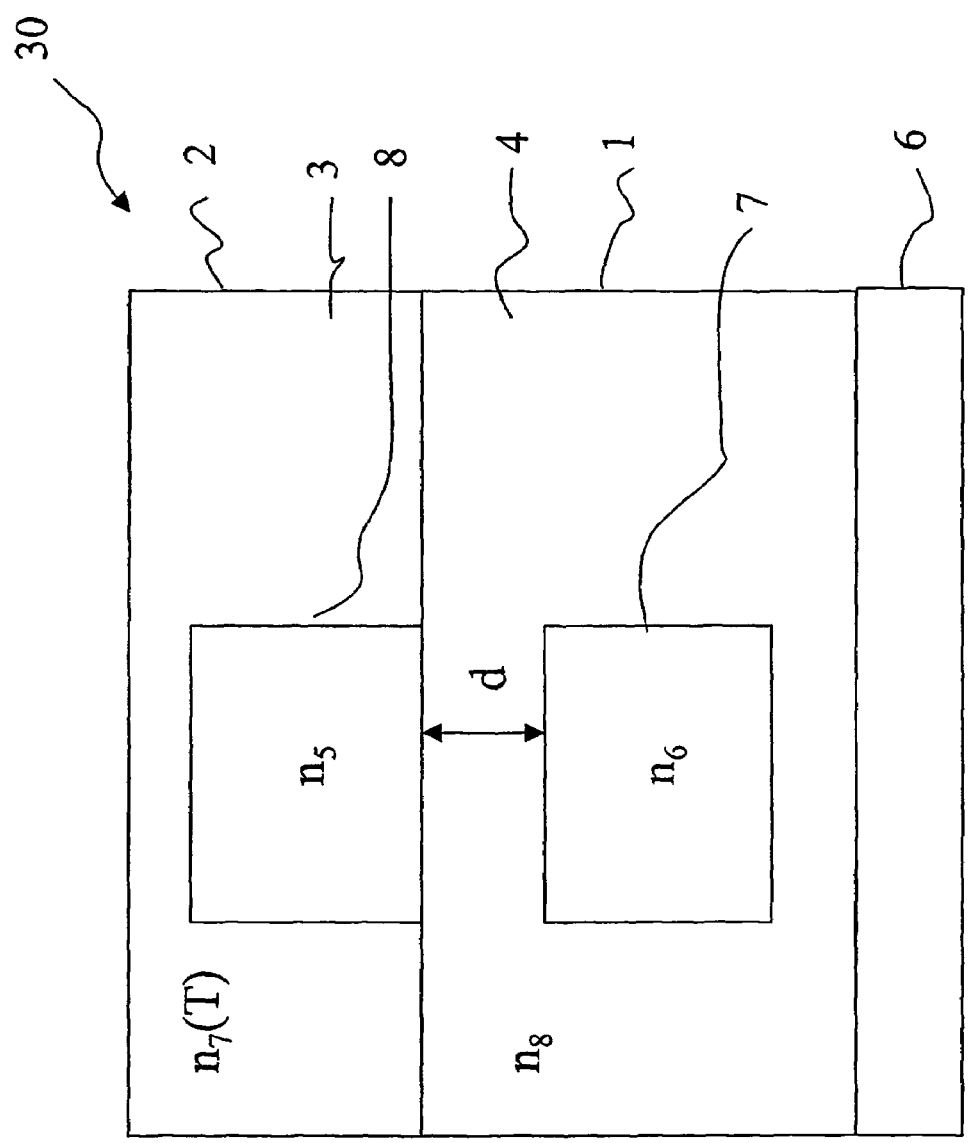
FIG. 5 is a cross sectional view of the co-directional grating assisted directional optical coupler of the type shown in FIG. 2b.
Figure 6:
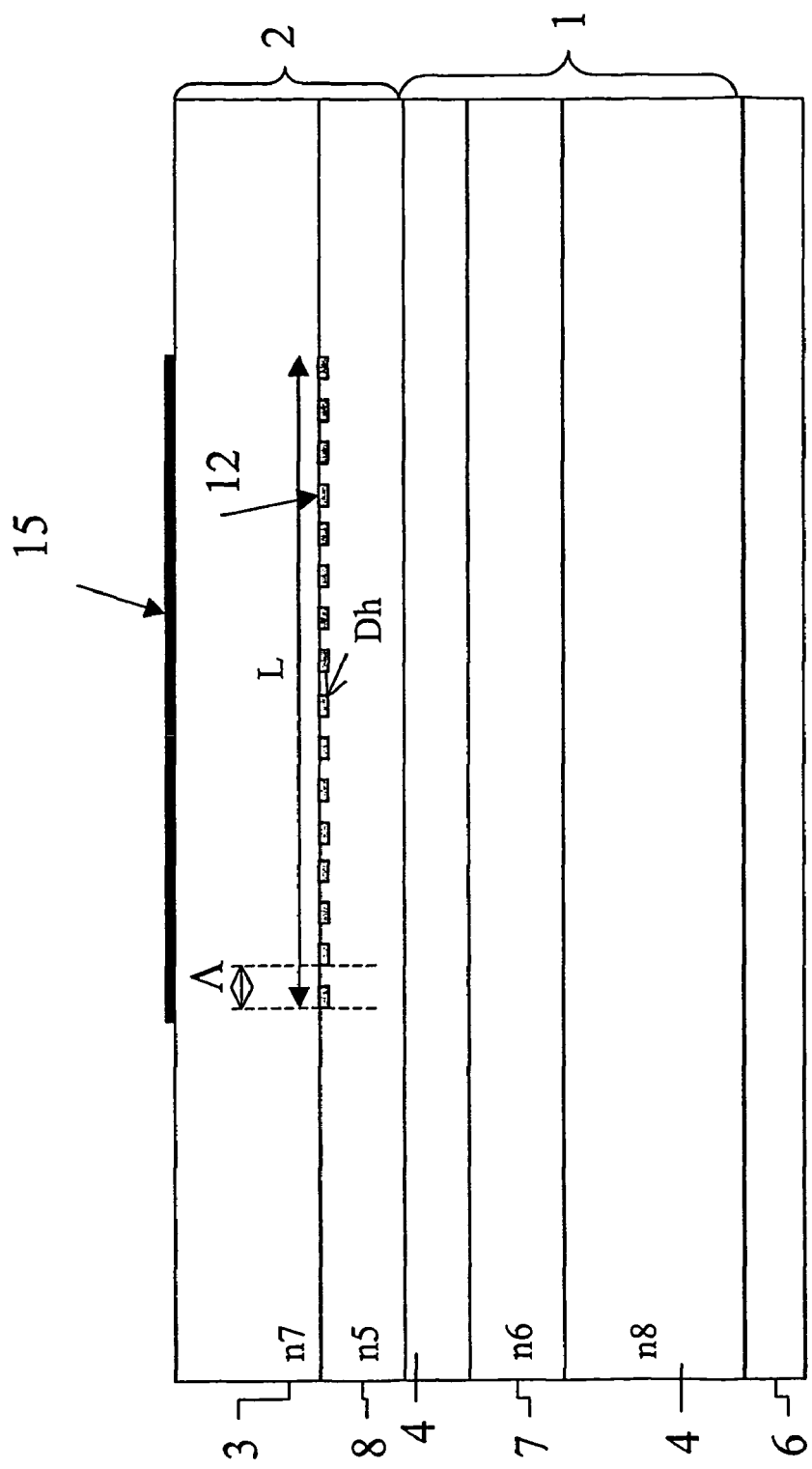
FIG. 6 is an enlarged cross-sectional view of a detail of the co-directional grating assisted directional optical coupler of FIG. 5.

FIGS. 5 and 6 schematically illustrate a cross-sectional view and a lateral cross-sectional view, respectively, of a co-directional coupler comprising two vertically stacked waveguides 1,2. The input waveguide is the lower waveguide 1 which has a Ge-doped silica square (6×6 μm²) core 7 with refractive index $n_6$ of 1.456 and a silica cladding 4 with refractive index $n_8$ of 1.446 on a silicon wafer substrate 6. The square (6×6 μm²) core 8 of the output waveguide 2 is realized in silicon oxynitride ($SiO_xN_y$) and has a refractive index $n_5$ of 1.49. The second tuneable cladding 3 is made of DeSolite™ 3471-1-129, whose refractive index $n_7(T)$ at room temperature is $n_7=1.48$. A metallic electrode 15 is placed on the top of the upper waveguide to actuate the tuning.

The grating 12 is realized on the upper core 8 and has a period Λ=47,805 μm for a total length of about 5,76 cm (1205 periods). In particular, the grating is realized on the top portion of the core of the output waveguide, in a location which is the most distant from the input waveguide to minimize transmission losses of the transmitted wavelengths.

Figure 7:
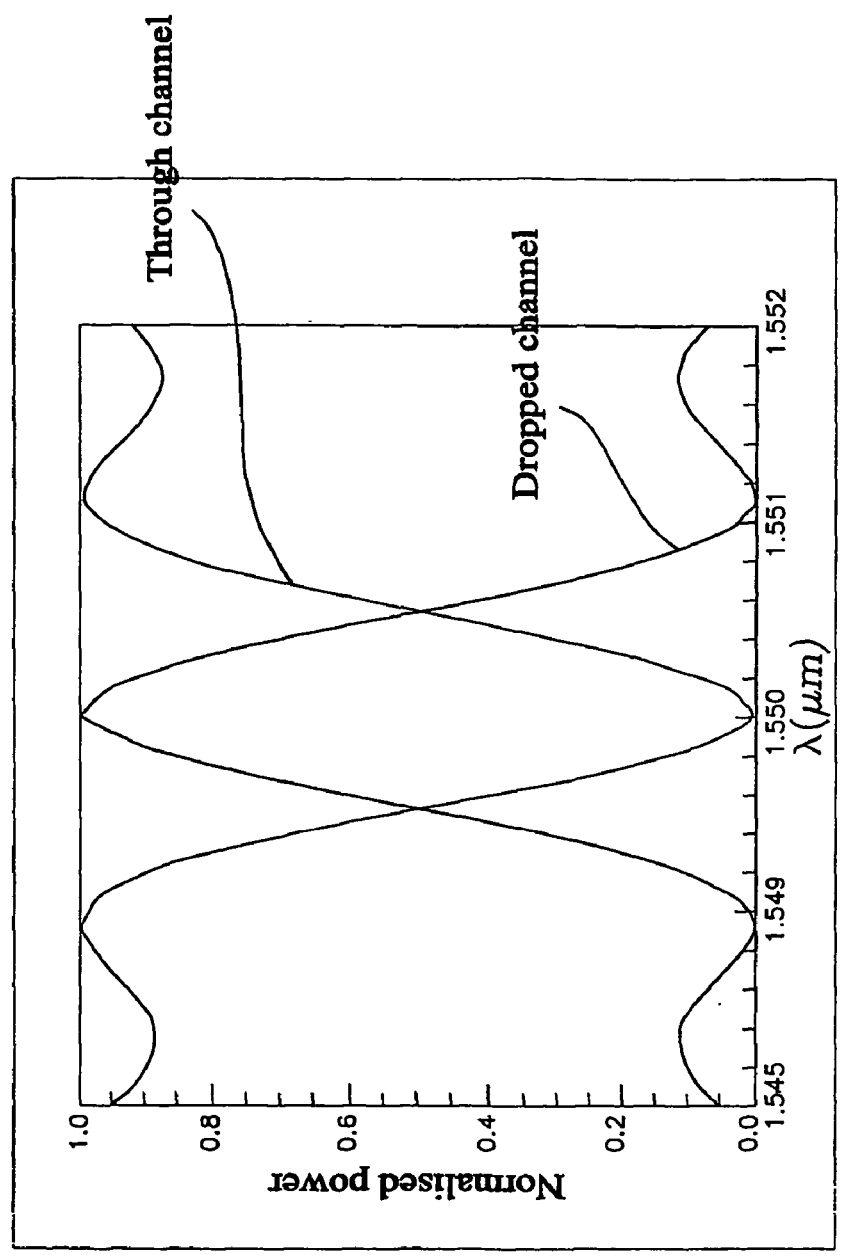
FIG. 7 is a graph showing the response (normalized power) of the co-directional coupler of FIGS. 5 and 6.

The bandwidth of this coupler is equal to 0.4 nm. An example of the spectra response of this coupler is given in FIG. 7, where the normalised power of the transmitted and of the dropped channel is shown.

Applicants have found that for a temperature variation of 50° C. the resulting tuning range Δλ is of about 40 nm.

As it can be clearly seen from the above example, the tuning range is relatively wide for the given temperature variation, compared to the contra-directional case. Generally speaking, the ratio between the $\Delta\lambda_0$ obtainable with a co-directional coupler and the $\Delta\lambda_0$ obtainable with a contra-directional coupler having the same characteristics is of about 10.

According to another aspect of the present invention, it is known, and it can be seen from eq. (I), that in contra-directional couplers the grating couples the desired channel from the first waveguide to the other and also an undesired channel back to the input waveguide, giving rise to channel cross-talk if the wavelength of this back reflected signal belongs to the bandwidth of interest (to which the channels of the signal belong). Therefore, given a certain bandwidth, it is clear that if the refractive effective indices $n_1$ and $n_2$ are not sufficiently different (i.e. K is too small) then the grating wave-vector will not only couple light from one waveguide to the other at $\lambda_0$ but may also reflect a different channel, $$\lambda_1 \left( \text{solution of the equation } K = \frac{4\pi n_1}{\lambda_1} \right),$$

back into the input waveguide. Applicants have found the smallest allowable index difference between the two waveguides so that the back-reflected channel will not be in the bandwidth of interest.

Figure 8:
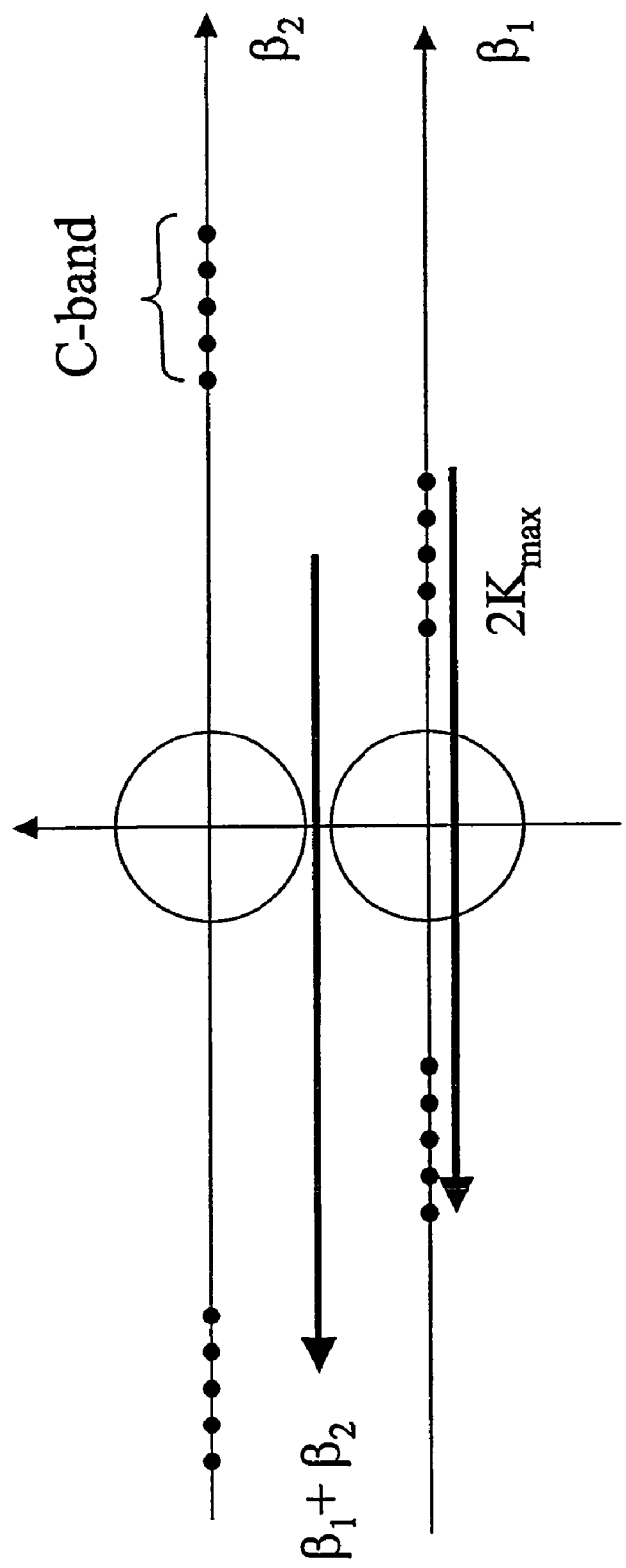
FIG. 8 shows a schematic wave-vector diagram including the wave-vector (β) positions corresponding to the C-band in the two waveguides forming the coupler of FIG. 1.

In FIG. 8, a wave-vector diagram for the two waveguides is shown (it is imposed that $n_1 > n_2$). Explicitly shown are the amplitudes of the wave-vectors of the Bragg grating necessary for contra-directional coupling between the two waveguides ($K=|\beta_1+\beta_2|$) and also that corresponding to a retro-reflection in the input waveguide ($K=|2\beta_1|$). As an example, the C-band is considered as the bandwidth of interest, however the following teaching can be applied to any bandwidth.

In order to avoid spurious reflections, the grating K-vector should be made preferably larger than a certain number. It can be inferred from FIG. 8 and eq. (I) that this condition is met when $$K_{min} > 2\beta_{max} \qquad (VI)$$

where $K_{min}$ is the smallest allowed grating K-vector and $\beta_{max}$ is the largest wave-vector in the bandwidth of interest. Using eq. (I) and (VI), eq. (V) is obtained:

$$n_2 - n_1 > 2n_1 \left( \frac{\lambda_{max}}{\lambda_{min}} - 1 \right),$$

where $\lambda_{min}$ and $\lambda_{max}$ are the smallest and the largest wavelengths in the desired bandwidth. If the condition in eq. (V) is met for the effective indices of the two waveguides, then the grating assisted contra-directional coupler of the present invention will work correctly in the desired bandwidth, i.e. it will drop/add only at $\lambda_0$ without affecting in any way any of the other wavelength channels.

EXAMPLE 4

With reference to FIG. 1, a coupler 10 designed to work in the C-band ($\lambda_{min}$=1530 nm, $\lambda_{max}$=1565 nm) is considered. The input waveguide is a standard low-index-contrast waveguide having an effective index $n_1$=1.45. From eq. (V), it requires that $n_2-n_1>0.066$, which means a rather large index contrast between the two waveguides with $n_2>1.516$.

EXAMPLE 5

Figure 10:
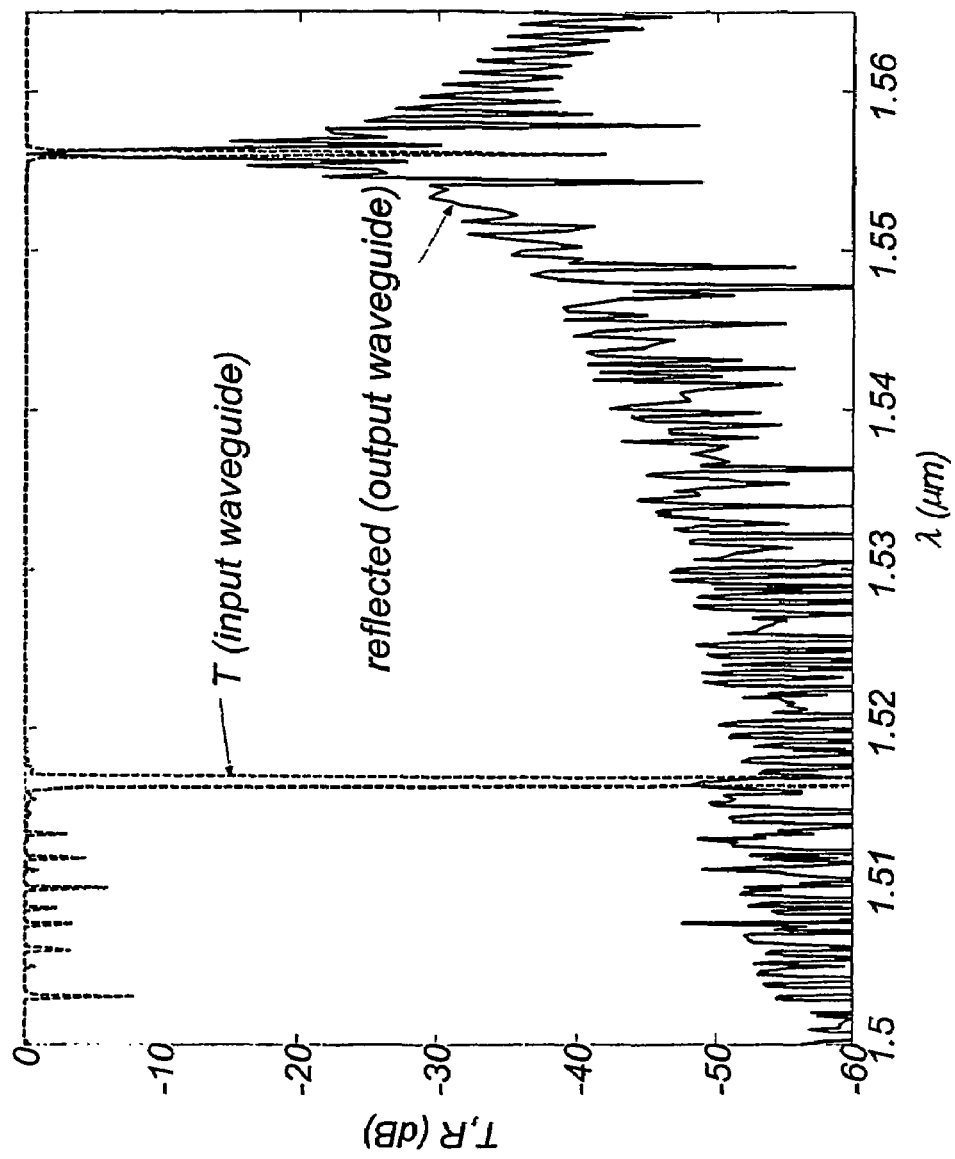
FIG. 10 is a graph showing the filter spectrum of an additional embodiment of the coupler of FIG. 1.

A coupler designed to work in the erbium C-band ($\lambda_{min}$=1530 nm, $\lambda_{max}$=1565 nm) is considered. The two waveguides are vertically stacked and have a square core. In particular the input lower waveguide 1 has core dimensions 4 μm×4 μm ($SiO_2$ doped with Ge) and effective index $n_{1c}$=1.447, while the output waveguide has core dimensions 1 μm×1 μm ($SiO_xN_y$) and effective index $n_{2c}$=1.517. The tuneable cladding is DeSolite™ 3471-1-129 and the other cladding is undoped $SiO_2$. A 1 cm-long grating is placed on the output waveguide. This coupler satisfies eq. (V) for the C-band and indeed the simulation plotted in FIG. 10 shows a dropped channel at 1.556 μm. A second spurious channel reflected back into the input waveguide is present at 1.516 μm and it is well outside the desired bandwidth.

EXAMPLE 6

Figure 9:
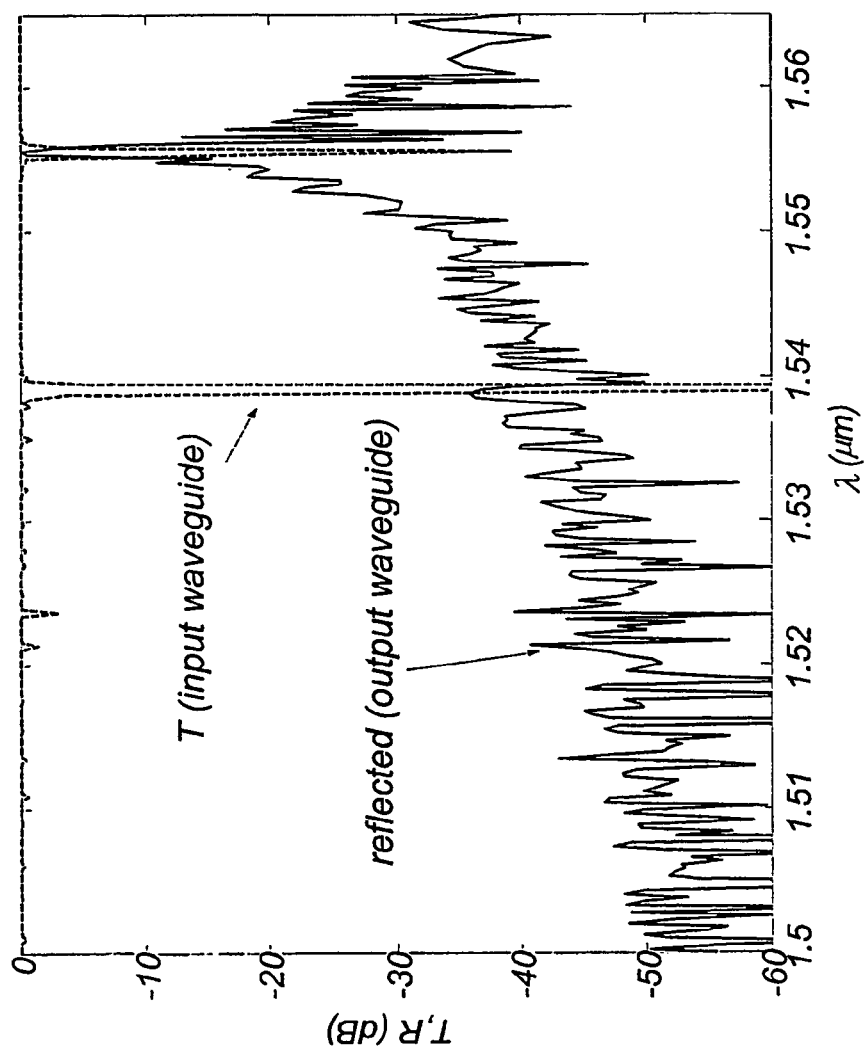
FIG. 9 is a graph showing the filter spectrum of an additional embodiment of the coupler of FIG. 1.

The coupler is identical to the coupler of Example 5, with the exception of the effective index of the second waveguide core that in this case is $n_{2c}$=1.472. Therefore eq. (V) is not satisfied for the erbium C-band: spurious channel are dropped in the erbium bandwidth. As visible from FIG. 9, a channel is reflected into the input waveguide at 1.536 nm thus compromising the coupler functionality.

Therefore, according to a preferred embodiment of the present invention, in case of construction of a contra-directional tuneable coupler, the materials of the waveguides will be preferably chosen so that their effective refractive indices satisfy eq. (V) always also during the tuning and therefore a correct working of the coupler is to be expected in all the desired bandwidth.

Figure 11:
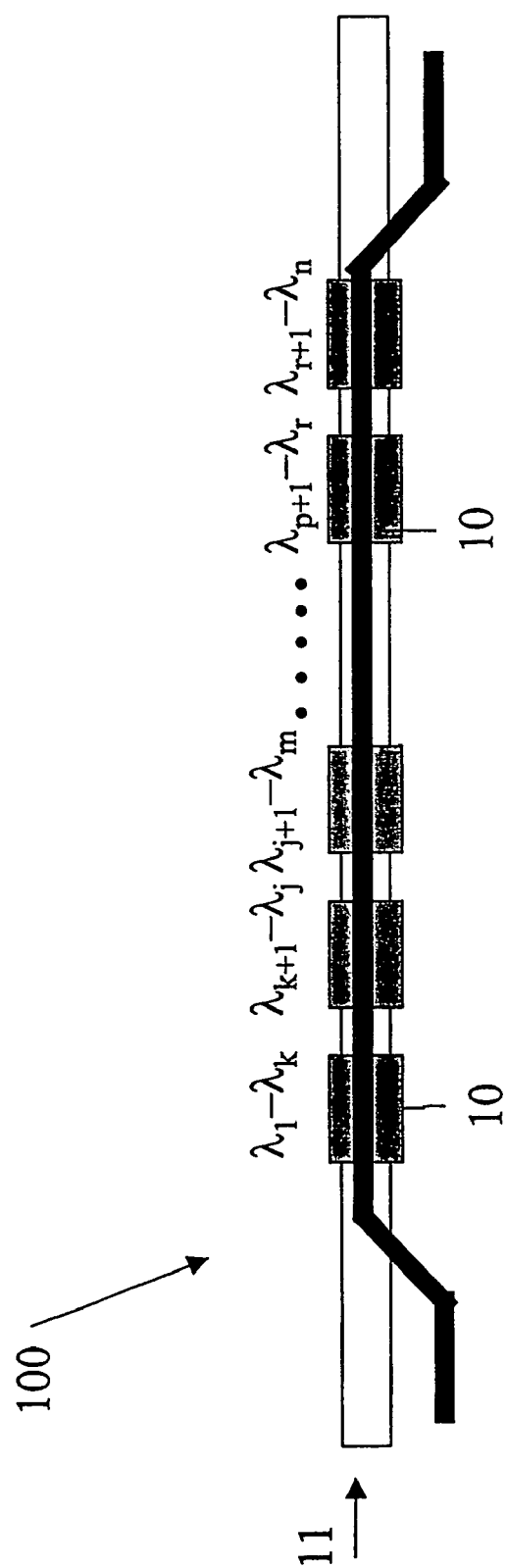
FIG. 11 schematically depicts an add/drop optical device including at plurality of tuneable grating assisted directional optical coupler of FIG. 1.

FIG. 11 shows an add/drop optical device 100 according to the present invention. The add/drop device 100 comprises a plurality of couplers 10 in series so as to be able to drop more than one channel and/or to extend the available tuning range of the overall device. Indeed, if one of the coupler 10 has a tuning range of 7 nm (see for example the coupler of example 1), then six couplers of the same type in series will be able to drop any channel in a 42 nm bandwidth. In this case only a single coupler 10 will be active at a given time, the other couplers will be rendered inactive by tuning the coupler peak in between any two channels. If the coupler response is correctly designed (i.e. the bandwidth of the coupler should be smaller than ½ of the channel spacing and the sidelobe suppression should be of the order of 30 dB), then this will allow to effectively switch the coupler 10 on and off.

The invention claimed is:

1. A tuneable grating assisted directional optical coupler to couple a transmission signal, comprising:
   a first waveguide comprising a first core and a first cladding, said first waveguide having a first effective refractive index;
   a second waveguide comprising a second core and a second cladding, said second waveguide having a second effective refractive index, different from said first effective index, and being in substantially close proximity to said first waveguide in a predetermined region to provide coupling therebetween; and
   a periodic perturbation positioned in said coupling region for causing said coupling to be wavelength selective for a given wavelength as a function of said first and/or said second effective refractive index;
   said second cladding of said second waveguide comprising a tuneable material and said first cladding of said first waveguide comprising a non-tuneable material.

2. The coupler according to claim 1, wherein said tuneable material has a refractive index which can be varied upon variation of an external parameter.

3. The coupler according to claim 2, wherein the tuneable material is variable with temperature and said tuneable material has a ratio $$\left|\frac{\Delta n}{n}\right|$$

between the refractive index variation Δn and the refractive index n of said tuneable material, the ratio not smaller than $10^{-2}$ for a temperature variation not greater than 100° C.

4. The coupler according to claim 2, wherein the tuneable material is variable with an electric field and said tuneable material has a ratio $$\left|\frac{\Delta n}{n}\right|$$

between the refractive index variation Δn and the refractive index n of said tuneable material, the ratio not smaller than $10^{-2}$ for an electric field variation not greater than 1 V/μm.

5. The coupler according to claim 2, wherein the refractive index n of said tuneable material is variable with temperature T and said tuneable material has a thermo-optic coefficient $$\left|\frac{dn}{dT}\right|$$

greater than or equal to $10^{-4}$/° C.

6. The coupler according to claim 2, wherein said tuneable material variable with temperature is a polymer.

7. The coupler according to claim 2, wherein the refractive index of said tuneable material is variable with electric field and said tuneable material has an electro-optic coefficient greater than or equal to 2.5 nm/V.

8. The coupler according to claim 1, wherein said first and said second waveguides are vertically stacked on a substrate.

9. The coupler according to claim 8, wherein said first waveguide is the lower waveguide, while said second waveguide is the upper waveguide.

10. The coupler according to claim 1, wherein said first and/or said second core comprises silicon compound material.

11. The coupler according to claim 1, wherein said first cladding of said first waveguide comprises silica glass.

12. The coupler according to claim 1, wherein said given wavelength is in the range of about 1530 nm to about 1565 nm.

13. The coupler according to claim 1, wherein said transmission signal carries a given number of optical channels having wavelengths comprising about 1530 to about 1565 nm.

14. The coupler according to claim 1, wherein said periodic perturbation is a Bragg grating having a grating period ($\Lambda$) and said given wavelength ($\lambda_0$) is given by $\lambda_0=\Lambda(n_1 \pm n_2)$, where $n_1$ is said first effective refractive index and $n_2$ is said second effective refractive index.

15. The coupler according to claim 1, wherein said transmission signal is supplied to said first waveguide and a coupled signal of said given wavelength is outputted by said second waveguide.

16. The coupler according to claim 15, wherein said transmission signal and said coupled signal are contra-propagating and said given wavelength ($\lambda_0$) is given by $\lambda_0=\Lambda(n_1+n_2)$, where $\Lambda$ is a grating period of said periodic perturbation, $n_1$ is said first effective refractive index, and $n_2$ is said second effective refractive index.

17. The coupler according to claim 16, wherein said transmission signal comprises one or more wavelengths between a lower wavelength value $\lambda_{min}$ and an upper wavelength value $\lambda_{max}$, and wherein said first effective refractive index $n_1$ and said second effective refractive index $n_2$ satisfy the following equation:

$$n_2 - n_1 > 2n_1 \left( \frac{\lambda_{max}}{\lambda_{min}} - 1 \right).$$

18. The coupler according to claim 15, wherein said transmission signal and said coupled signal are co-propagating and said given wavelength ($\lambda_0$) is given by $\lambda_0=\Lambda(n_1-n_2)$, where $\Lambda$ is a grating period of said periodic perturbation, $n_1$ is said first effective refractive index, and $n_2$ is said second effective refractive index.

19. The coupler according to claim 1, wherein said periodic perturbation is realised on the first waveguide.

20. The coupler according to claim 19, wherein said periodic perturbation is realised on said first core of said first waveguide.

21. An add/drop optical device comprising one or more tuneable grating assisted directional optical couplers, at least one of the tuneable grating assisted directional optical couplers comprising:

a first waveguide comprising a first core and a first cladding, said first waveguide having a first effective refractive index;

a second waveguide comprising a second core and a second cladding, said second waveguide having a second effective refractive index, different from said first effective index, and being in substantially close proximity to said first waveguide in a predetermined region to provide coupling therebetween; and a periodic perturbation positioned in said coupling region for causing said coupling to be wavelength selective for a given wavelength as a function of said first and/or said second effective refractive index;

said second cladding of said second waveguide comprising a tuneable material and said first cladding of said first waveguide comprising a non-tuneable material.

* * * * *